United States Patent
Ansart et al.

[11] Patent Number: 5,713,207
[45] Date of Patent: Feb. 3, 1998

[54] ANNULAR COMBUSTION CHAMBER WITH A PERFORATED WALL

[75] Inventors: Denis Roger Henri Ansart, Bois Le Roi; Jean-Claude Marcel Boudot, Hericy Sur Seine; Thierry André Jacques Chevalier, Thomery; Denis Jean Maurice Sandelis, Nangis, all of France

[73] Assignee: Societe National D'Etude et de Construction de Moteurs D'Aviation S.N.E.C.M.A., Paris, France

[21] Appl. No.: 660,599

[22] Filed: Jun. 11, 1996

[30] Foreign Application Priority Data

Jun. 14, 1995 [FR] France .................... 95 07054

[51] Int. Cl.⁶ .......................................... F02G 3/00
[52] U.S. Cl. .......................................... 60/757; 60/755
[58] Field of Search ...................... 60/752, 755, 757

[56] References Cited

U.S. PATENT DOCUMENTS

| | | |
|---|---|---|
| 2,458,497 | 1/1949 | Bailey . |
| 3,623,711 | 11/1971 | Thorstenson . |
| 4,773,593 | 9/1988 | Auxier et al. . |
| 4,848,081 | 7/1989 | Kennedy . |
| 4,887,663 | 12/1989 | Auxier et al. .................... 60/757 |
| 5,000,005 | 3/1991 | Kwan et al. . |
| 5,261,223 | 11/1993 | Foltz . |

FOREIGN PATENT DOCUMENTS

| | | |
|---|---|---|
| 0 151 918 | 8/1985 | European Pat. Off. . |
| 2635577 | 2/1990 | France . |
| 1093515 | 12/1967 | United Kingdom . |
| 1344800 | 1/1974 | United Kingdom . |

Primary Examiner—Charles G. Freay
Attorney, Agent, or Firm—Bacon & Thomas

[57] ABSTRACT

A wall is disclosed for a gas turbine engine combustion chamber having a generally annular configuration around a central axis wherein the wall has an inner surface bounding at least a portion of the combustion chamber and a plurality of rows of cooling openings, each cooling opening having an elongated, generally rectangular configuration with a length l and a width e such that l is greater than e, the cooling openings in each row being equidistantly spaced apart a distance d in which d is not greater than the length l. The cooling openings of a given row are circumferentially displaced from cooling openings of an adjacent row and, since the distance d is not greater than the length l of the cooling openings, the opening areas overlap in adjacent rows to provide an even distribution of the cooling film within the combustion chamber.

7 Claims, 2 Drawing Sheets

ANNULAR COMBUSTION CHAMBER WITH A PERFORATED WALL

BACKGROUND OF THE INVENTION

The present invention relates to a gas turbine combustion chamber wall, more particularly such a wall having a generally annular configuration with multiple perforations, each having an elongated configuration to insure cooling of the inner service of the wall.

Present day gas turbine engine combustion chambers have walls with cooling orifices to enable cooling air to pass from the exterior of the combustion chamber through the combustion chamber wall so as to form a film of cooling air on the inner surface of the wall to protect it from the heat within the combustion chamber. Typically, such cooling orifices are circular in cross-sectional configuration and have their axes slanted relative to the inner surface of the wall to facilitate the formation of the cooling film. The diameters of the known cooling orifices range between 0.3–0.5 mm with the number of such orifices utilized being as high as 40,000–50,000. The ratio of the total orifice cross-sectional area to the area of the cooled surface ranges between 0.015 and 0.025.

Today's pollution standards require significant restriction on the emissions of smoke, nitrogen oxides and carbon oxides from gas turbine engines. The operating conditions of the combustion chamber and, in particular, the temperatures and the fuel/oxidizer ratio must be controlled under all operating conditions of the engine. The flow per unit surface of the cooling must also be controlled. However, the tolerances required to machine the known cooling orifices cannot sufficiently guarantee the accuracy of the diameters of the orifices. Consequently, the flow of cooling air into the combustion chamber can only be accurately controlled with great difficulty.

SUMMARY OF THE INVENTION

A wall is disclosed for a gas turbine engine combustion chamber having a generally annular configuration around a central axis wherein the wall has an inner surface bounding at least a portion of the combustion chamber and a plurality of rows of cooling openings, each cooling opening having an elongated, generally rectangular configuration with a length l and a width e such that l is greater than e, the cooling openings in each row being equidistantly spaced apart a distance d in which d is not greater than the length l.

The cooling openings of a given row are circumferentially displaced from cooling openings of an adjacent row and, since the distance d is not greater than the length l of the cooling openings, the opening areas overlap in adjacent rows to provide an even distribution of the cooling film within the combustion chamber.

The wall having the cooling openings configured and oriented in the present invention provides a higher ratio of total orifice cross-sectional area to the cooling surface area and can be carried out with more rigorous machining tolerances. The width of the generally rectangular, elongated cooling openings of the present invention is approximately the same size as the diameters of the known generally cylindrical cooling orifices. The length l is at least ten times the width e of the cooling openings.

DETAILED DESCRIPTION OF THE PREFERRED EMBODIMENT

Figure 1:
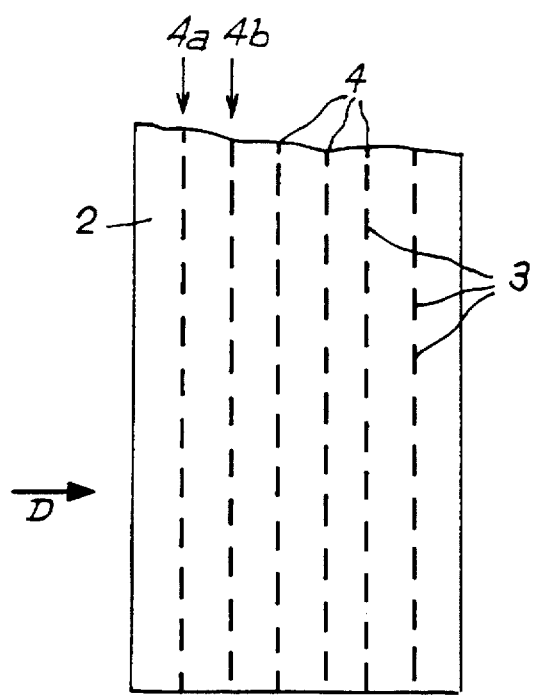
FIG. 1 is a partial, external view of a combustion chamber wall according to the present invention.
Figure 2:
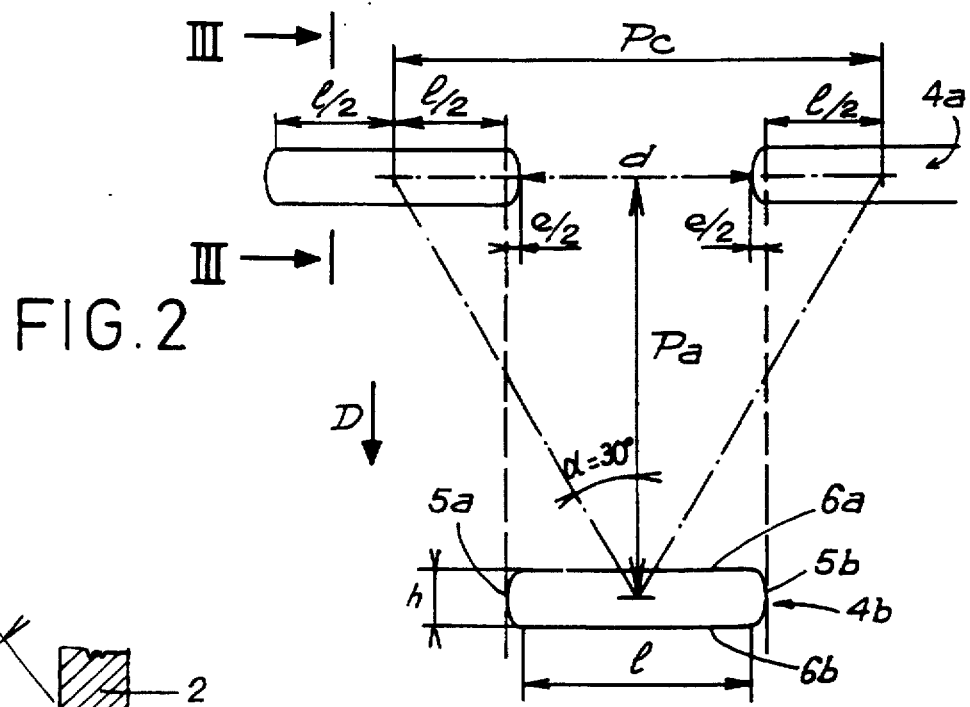
FIG. 2 is a partial, enlarged view of the wall in FIG. 1 illustrating the relationship between the openings.
Figure 5:
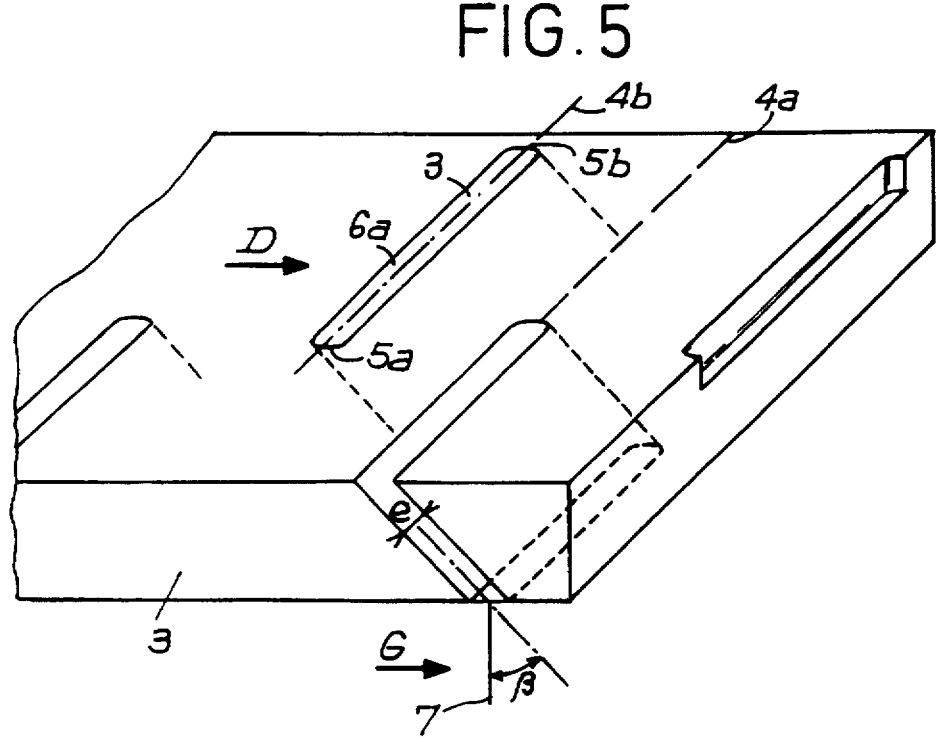
FIG. 5 is a partial, perspective view of the wall according to the present invention.

FIG. 1 illustrates an external view of a portion of annular wall 2 of a gas turbine engine combustion chamber wherein the cooling air passes externally of the combustion chamber in the direction D and wherein the combustion gases within the combustion chamber circulate in the direction G, as illustrated in FIG. 5. The wall 2 is perforated by a plurality of elongated cooling openings 3 which are arranged in a plurality of circular rows 4, each row lying in a plane extending generally perpendicular to the direction D. The cooling openings 3 are equidistantly circumferentially spaced apart in each row a distance d which is not greater than the length l of each cooling opening in order to insure that the openings of two adjacent rows overlap so as to form a uniform cooling film on the inner surface of wall 2. As can be seen, each cooling opening 3 has as a generally rectangular cross-sectional configuration with a length l and a width e wherein l is greater than e. Each cooling opening 3 has opposite lateral ends 5a and 5b each having a generally semi-circular configuration with a diameter equal to e. The parallel walls 6a and 6b form the two remaining sides of the rectangular configuration and are spaced apart from each other a distance equal to the width e.

Figure 3:
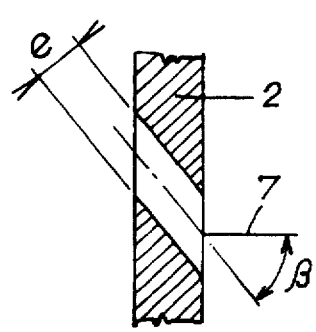
FIG. 3 is a cross-sectional view taken along line III—III in FIG. 2.

As best seen in FIGS. 3 and 5, the walls 6a and 6b are slanted relative to the direction of the cooling air and combustion chamber gas flows and form an angle $\beta$ relative to a line 7 extending perpendicularly from the inner surface of wall 2. The angle $\beta$ may be counter flow to the general gas flow direction, the significant feature being that the cooling air will flow in the direction G of the local combustion gases within the combustion chamber.

The present invention allows improving the ratio of the total cooling opening cross-sectional area to the total area of the cooled surface. By selecting an equilateral array which is 12.23 mm on each side, and with the cooling openings 3 having a length l equal to 6.14 mm and a width e equal to 0.5 mm, the ratio will then be 0.025, a significant improvement over the ratios of the known combustion chamber wall constructions.

Figure 4:
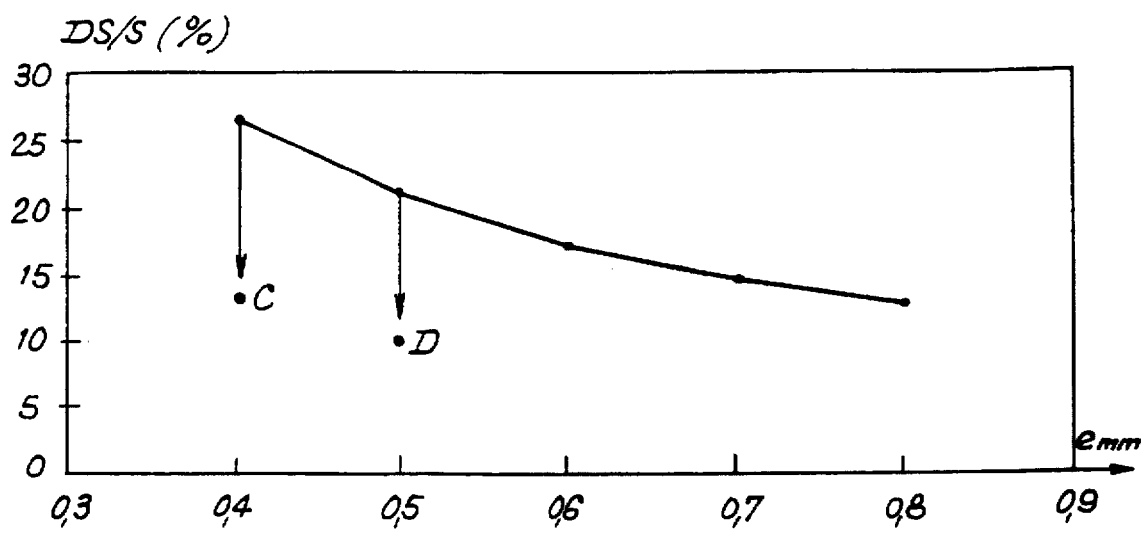
FIG. 4 is a graph illustrating the effect of machining tolerances on the cross-sections of the multiple orifices of the prior art and of the present invention.

FIG. 4 is a graph illustrating the characteristic relationship between dimensional tolerances and the diameter of the cylindrical cooling orifices of the prior art. The curve shows the ratio of the difference in total surface area of the orifices due to machining tolerances to the theoretical total surface area of the openings (DS/S) as a function of the cylindrical orifice diameters, the machining tolerance being 0.05 mm. The two representative points C and D are plotted for the invention. Given an elongated cooling opening 3 having a thickness e same as the diameter of the known cylindrical orifices, the surface deviation from the theoretical surface is significantly less, the improvement being approximately 50%.

The foregoing description is provided for illustrative purposes only and should not be construed as in any way limiting this invention, the scope of which is defined solely by the appended claims.

We claim:

1. A wall for a gas turbine engine combustion chamber having a generally annular configuration around a central axis, the wall having an inner surface bounding at least a portion of the combustion chamber and comprising a plurality of rows of cooling openings, each cooling opening having an elongated generally rectangular configuration with a length l and a width e wherein l>e, the cooling openings in each row being equidistantly spaced apart a distance d in which d is not greater than l wherein the length l is at least ten times the width e.

2. The wall of claim 1 wherein the cooling openings of a row are circumferentially displaced from the cooling openings of an adjacent row.

3. The wall of claim 1 wherein the length l of each cooling opening is oriented generally perpendicular to a gas flow passing over the wall.

4. A wall for a gas turbine engine combustion chamber having a generally annular configuration around a central axis, the wall having an inner surface bounding at least a portion of the combustion chamber and comprising a plurality of rows of cooling openings, each cooling opening having an elongated generally rectangular configuration with a length l and a width e wherein l>e, the cooling openings in each row being equidistantly spaced apart a distance d in which d is not greater than l wherein each cooling opening has opposite ends, each having a generally semi-circular configuration.

5. The wall of claim 4 wherein the length l is at least ten times the width e.

6. The wall of claim 4 wherein the cooling openings of a row are circumferentially displaced from the cooling openings of an adjacent row.

7. The wall of claim 4 wherein the length l of each cooling opening is oriented generally perpendicular to a gas flow passing over the wall.

* * * * *